(12) United States Patent  
Sastry et al.

(10) Patent No.: US 9,259,121 B2  
(45) Date of Patent: Feb. 16, 2016

(54) OHMIC HEATING PACKET

(75) Inventors: Sudhir K. Sastry, Dublin, OH (US); Brian F. Heskitt, Sunbury, OH (US); Soojin Jun, Honolulu, HI (US); Romel Somavat, Columbus, OH (US)

(73) Assignee: The Ohio State University, Columbus, OH (US)

( * ) Notice: Subject to any disclaimer, the term of this patent is extended or adjusted under 35 U.S.C. 154(b) by 129 days.

(21) Appl. No.: 13/228,561

(22) Filed: Sep. 9, 2011

(65) Prior Publication Data

US 2013/0062332 A1 Mar. 14, 2013

(51) Int. Cl.  
*A47J 36/24* (2006.01)

(52) U.S. Cl.  
CPC .................. *A47J 36/2483* (2013.01)

(58) Field of Classification Search  
USPC .................. 219/385, 386, 387, 521, 533, 541; 426/234, 244, 412  
See application file for complete search history.

(56) References Cited

U.S. PATENT DOCUMENTS

| | | | | |
|---|---|---|---|---|
| 3,245,338 A | * | 4/1966 | Korr | 99/358 |
| 3,863,048 A | * | 1/1975 | Buckley | 219/383 |
| 3,873,742 A | * | 3/1975 | Miyahara | 426/234 |
| 3,886,290 A | * | 5/1975 | Theimer et al. | 426/107 |
| 5,279,213 A | * | 1/1994 | Miyahara | 99/358 |
| 5,345,069 A | * | 9/1994 | Grindrod | 219/730 |
| 5,540,941 A | | 7/1996 | Stevens et al. | |
| 5,598,502 A | * | 1/1997 | Takahashi et al. | 392/502 |
| 6,399,127 B1 | * | 6/2002 | Beck et al. | 426/244 |

OTHER PUBLICATIONS

Jun, S. and Sastry, S.K., Modeling and Optimization of Ohmic Heating of Foods Inside the Flexible Package, Journal of Food Process Engineering, 2005, 28(4), 417-436.

Jun, S. and Sastry, S.K., Reusable Pouch Development for Long Term Space Missions: A 3D Ohmic Model for Verification of Sterilization Efficacy, Journal of Food Engineering 80, 2007, 1199-1205.

* cited by examiner

*Primary Examiner* — Tu B Hoang  
*Assistant Examiner* — Amit K Singh  
(74) *Attorney, Agent, or Firm* — Yimei C. Hammond; Kremblas & Foster

(57) ABSTRACT

A hermetically-sealed, ohmic heating packet for storing, heating and sterilizing food and beverage items. The packet is formed of a multilayer laminate material having interior and exterior polymer layers and an intermediate metallic foil layer. Conductive tags on the exterior of the packet are electrically connected to electrodes on the interior of the packet through reverse-patched regions of the packet's sidewalls. The configuration of the electrical connection prevents current from leaking into the metallic foil layer of the packet during heating, thereby mitigating the risk of a short circuit condition in the packet. The rectangular prism geometry of the packet and the parallel configuration of the electrodes within the packet facilitate uniform heating of the packet's contents.

7 Claims, 6 Drawing Sheets

OHMIC HEATING PACKET

BACKGROUND OF THE INVENTION

This invention relates generally to the field of food heating and sterilization devices and relates more particularly to a sterile, ohmic heating packet including a hermetic electrical connection between the inside of the packet and the outside of the packet.

As emerging aerospace technologies allow human beings to travel further into outer space for longer periods of time, greater quantities of provisions, such as food and beverage items, must be transported into space to provide astronauts with adequate sustenance for long-duration missions. It is therefore critical that such food and beverage items be compact and lightweight. It is also critical that such food and beverage items be stored in a manner that is resistant to spillage and contamination. Given the constrained availability of electrical power on space missions, it is also important that food and beverage items that are to be consumed aboard spacecraft can be heated and sterilized in an energy efficient manner.

Food quality is also a primary consideration in situations where provisions must be rationed and the availability of fresh food is limited or nonexistent. Typically, packaged foods that are sterilized using conventional, external hot media need to be heated for long periods of time to ensure that the slowest heating regions within the package achieve sterility. This results in significant nutritional and quality loss in the overheated portions of the food product. If heating could be made more uniform, sterilization process times could be significantly reduced, resulting in far superior product quality.

It would therefore be advantageous to provide a lightweight, hermetically sealed food and beverage container that facilitates heating and sterilization of its contents in a convenient manner that requires relatively little energy. It would further be advantageous to provide such a container that facilitates highly uniform heating of its contents. It would further be advantageous to provide such a container that can be reused following food consumption to contain and sterilize additional food product or waste materials that are otherwise difficult or impossible to process.

BRIEF SUMMARY OF THE INVENTION

In accordance with the present invention, there is provided a lightweight, ohmic heating packet for storing, heating and sterilizing food and beverage items in a convenient and efficient manner. Particularly, the packet utilizes a highly uniform electric field to ensure uniform heating of the contents of the packet, thereby providing a high quality end product. The packet is capable of heating food and beverages using relatively little electrical power and without the use of an external heat source. The inventive packet thus has the potential for use in situations and in environments with constrained energy availability, such as during space missions and aboard earth-based transport vehicles.

The preferred embodiment of the present invention includes a rectangular prism-shaped packet having two opposing major sidewalls, two opposing minor sidewalls, and two opposing end walls. The packet is formed of a cut-and-folded sheet multilayer laminate material that preferably includes: a first polymer layer (can be made of polypropylene or polyethylene, or a variety of different but suitable materials) that provides the packet with a sterile, interior food-contact surface and a heat barrier; a second metallic foil layer (can be made of aluminum) that provides the packet with a gas, moisture, and light barrier; and a third polymer layer that provides that packet with a durable, scratch-resistant exterior. Each minor sidewall of the packet has a hole formed through it. A patch of multilayer laminate material is hermetically sealed over each of the holes on the interior of the packet in a reverse patch configuration. One or more electrodes flatly abut each of the patches and extend along the minor sidewalls. Electrically conductive tags flatly abut the exteriors of each of the minor sidewalls. Electrically conductive "stuffings" (small nut and bolt assemblies) extend through, and securely affix, each of the patches, electrodes, and tags to their respective minor sidewalls. Since the stuffings only pass through the patches that cover the holes in the packet, they are not in contact with the metallic foil layer of the laminate material that forms the packet. The electrodes, electrically conductive tags, and electrically conductive stuffings are preferably made of metal. Electrically conductive tags can also be referred to as "conductive tags," or preferably the "tags." Electrically conductive stuffings can be referred to as the "stuffing".

In order to heat and sterilize food and beverage items within the inventive ohmic heating packet, electrical current is applied to the tags on the exterior of the packet. The current is conducted from the tags, through the stuffings in the minor sidewalls of the packet, to the electrodes on the interior of the packet. The current then passes between the electrodes, through the food or beverage item in the packet, thereby rapidly heating the food or beverage item.

The reverse patch configuration of the electrical contact points in the walls of the ohmic heating packet allows electrical current to flow from the exterior of the packet to the interior of the packet while preventing the current from leaking into the metallic foil layer of the laminate material that forms the packet. The risk of a short-circuit condition during heating of the packet's contents is thereby mitigated. Additionally, the configuration of the packet maintains a hermetic seal between the interior of the packet and the exterior of the packet, thereby preventing the transmission of food, gases and harmful microorganisms through the electrical connection points.

The ohmic packet exploits the benefits of high energy transfer efficiencies (close to 100%) associated with ohmic heating relative to conventional heating devices. The rectangular prism geometry of the inventive ohmic packet provides a uniform electric field throughout the packet, resulting in a uniform heating profile which is critical for sterilization purposes. The packet also presents a shape that is convenient to handle and store.

The ohmic heating packet can be used for carrying and storing pre-sterile, shelf-stabilized food in a manner similar to US Army issued Meal Ready to Eat (MRE) packets. One particularly useful application of the ohmic heating packet is the heating of food and beverage items inside moving vehicles, where electrical energy resources are relatively limited. A specialized heating enclosure, defined by an insulated box containing a pair of electrically conductive plates in a spaced relationship, can be installed in the vehicle, such as in the vehicle's glove box, for accepting the ohmic heating packet. The packet is slid into a slot formed in the heating enclosure, such as in the manner of a conventional toaster oven or a video cassette player, and the tags of the exterior of the packet are brought into contact with the conductive plates of the enclosure. The conductive plates are electrically energized and electrical current is conducted from the plates to the electrodes inside the packet. The heating enclosure thereby provides a highly convenient means for heating and sterilizing the contents of the packet.

Figure 1:
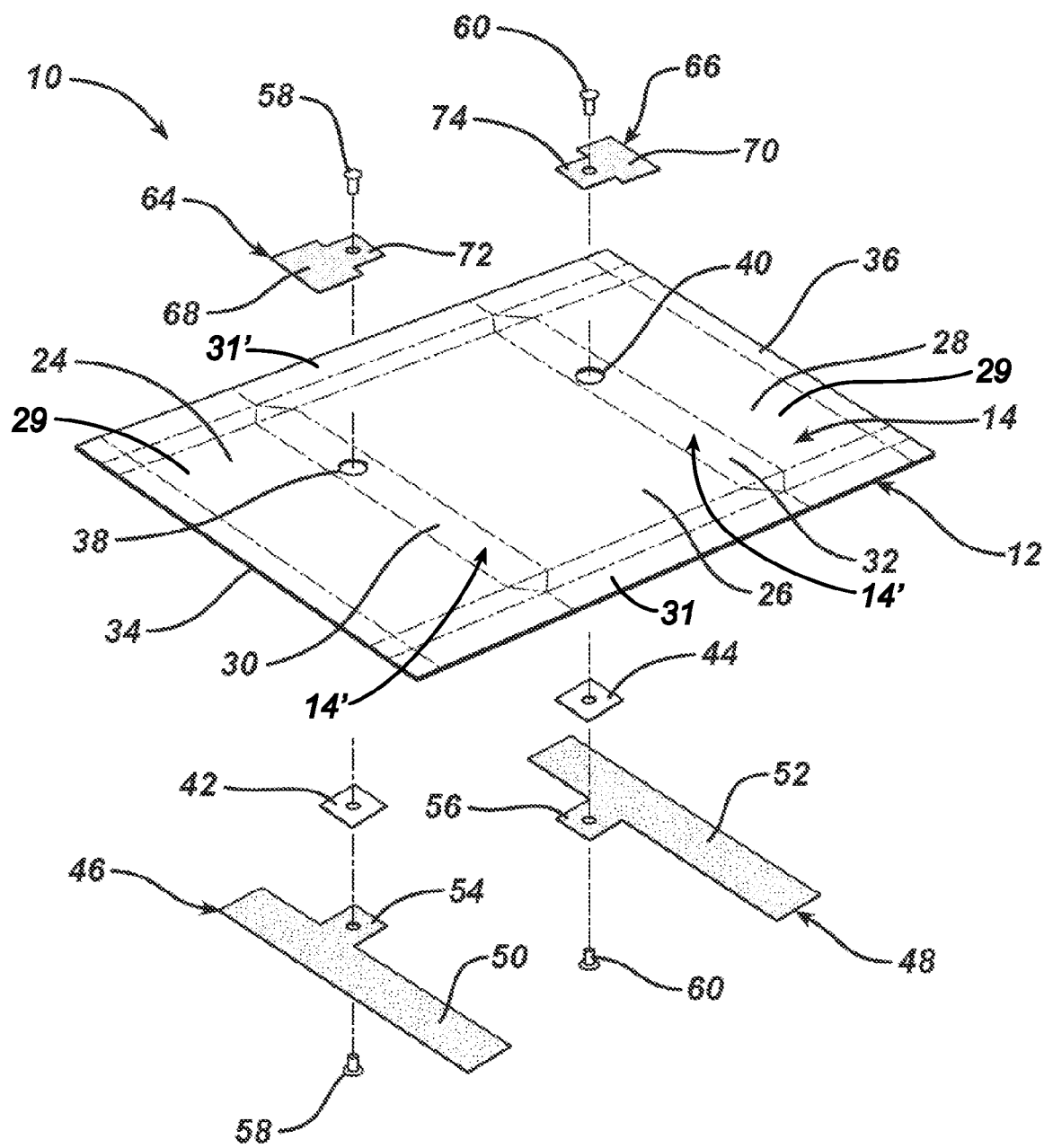
FIG. 1 is an exploded view illustrating the preferred embodiment of the present invention in an unfolded, unbounded configuration.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

Referring to FIGS. 1-12, an ohmic heating packet 10 for facilitating hermetic packaging and convenient heating and sterilization of food and beverage items is shown. The packet 10 is shown completely unfolded and unbonded in FIG. 1 for clarity, and is shown in its inventive, folded and bonded form (described in greater detail below) in FIG. 12. For the sake of convenience and clarity, terms such as "length," "width," "interior," "exterior," "lateral," and "longitudinal" will be used herein to describe the relative size and orientation of various portions and components of the invention, all with respect to the geometry and orientation of the packet 10 as it appears in FIG. 12. This terminology will include the words specifically mentioned, derivatives thereof, and words of similar import.

Figure 2:
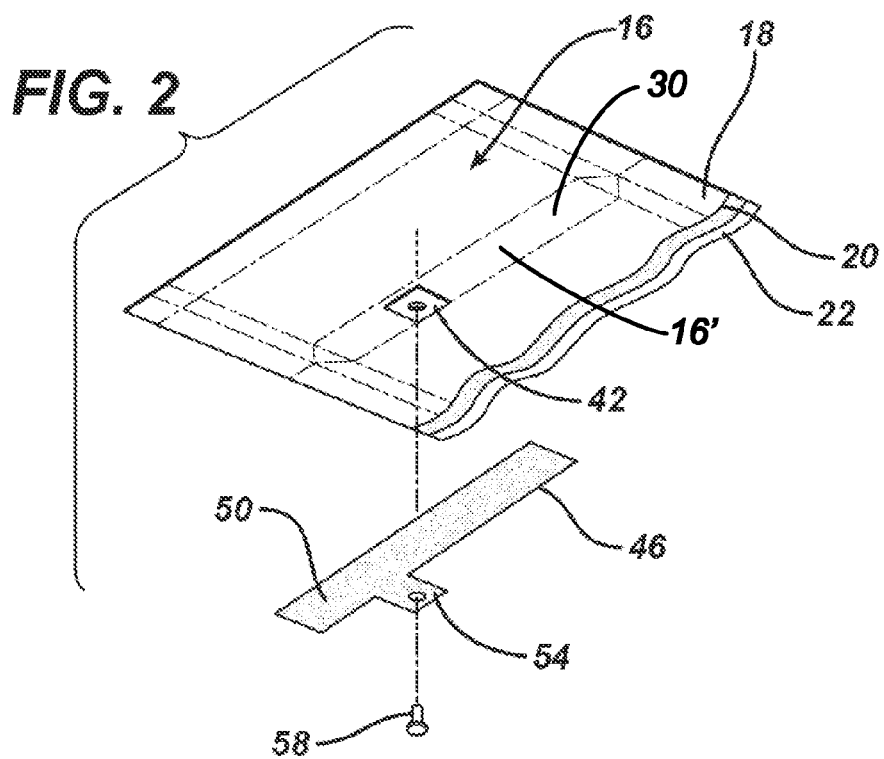
FIG. 2 is an exploded view illustrating an interior portion of the preferred embodiment of the present invention shown in FIG. 1.
Figure 7:
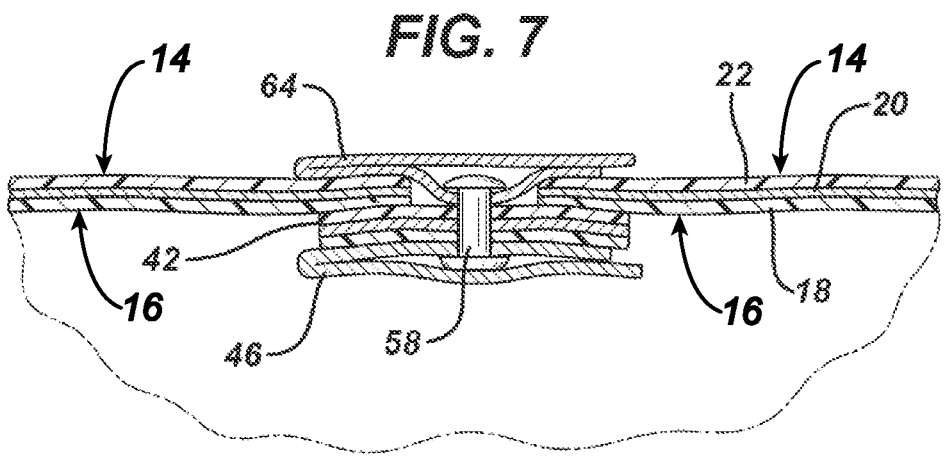
FIG. 7 is a view in section illustrating a portion of the preferred embodiment of the present invention shown in FIG. 1 as taken along view line 7-7 in FIG. 4.

Referring to FIG. 1, the packet 10 is preferably formed of a single sheet 12 of multilayer laminate material having an exterior side 14 and an interior side 16 (see FIG. 2). As shown in FIGS. 2 and 7, the laminate sheet 12 is formed of 3 separate layers: 1) a first polymer layer 18 that provides the packet 10 with a sterile food-contact surface and a heat barrier; 2) a second metallic foil layer 20 that provides the packet 10 with a gas, moisture and light barrier; and 3) a third polymer layer 22 that provides that packet 10 with a durable, scratch-resistant exterior. It is contemplated that the laminate sheet 12 can include a greater or lesser number of layers, each of which can be formed from a variety of different materials. The first polymer layer 18 can also be referred to as "an interior polymer layer 18." The interior polymer layer 18 can be made of polypropylene, polyethylene, or a variety of suitable materials so long as it provides the packet with a sterile food-contact surface and a heat barrier. A second metallic foil layer 20 can be refer to as "a layer of metallic foil 20" or "the metallic foil layer 20", or "the metallic foil layer," preferably is made of aluminum or a variety of other suitable materials so long as it provides the packet with a gas, moisture and light barrier. In some embodiments, the second metallic foil layer is electrically conductive. The third polymer layer 22 can be referred to as "an exterior polymer layer 22," and can be made of a variety of suitable materials so long as it provides a durable, scratch-resistant exterior. For example, an embodiment of the packet 10 is contemplated in which the laminate sheet 12 is formed of a first layer of polyethylene 18, a middle layer of any metal foil 20, and an external layer of polyethylene 22. Alternatively, the laminate sheet 12 is formed of a layer of metallic foil 20 sandwiched between an exterior polymer layer 22 and an interior polymer layer 18. These materials are suggested for purposes of illustration only, and mentioning these by name is not intended to narrow the scope of this invention. It is further contemplated that the packet 10 can be formed of more than one of the laminate sheets described herein.

Figure 12:
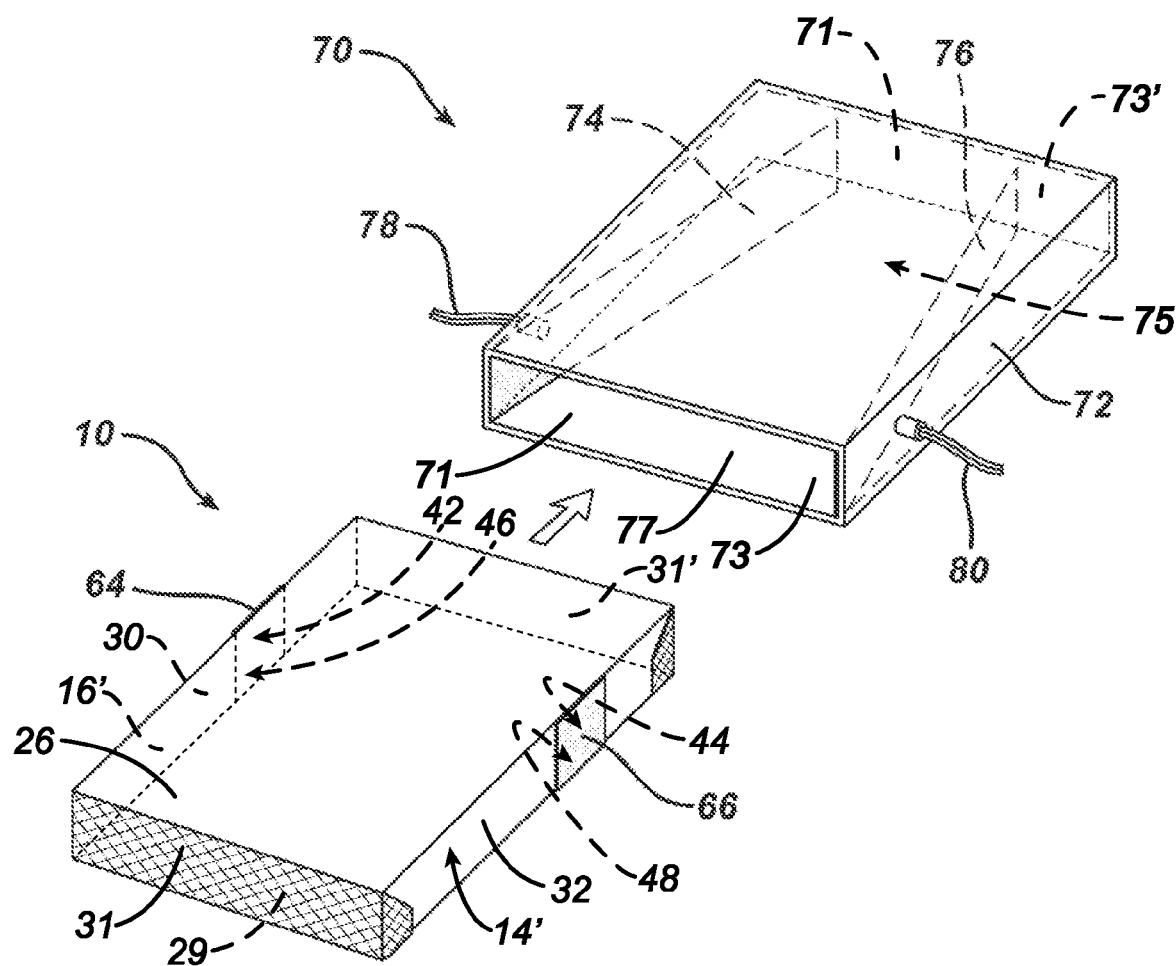
FIG. 12 is a perspective view illustrating the preferred embodiment of the present invention shown in FIG. 1 in a folded and bonded configuration and a slide-in heating device.

Referring back to FIG. 1, a plurality of fold lines (shown as dashed lines) are formed in the laminate sheet 12, such as by pleating the sheet, for allowing the laminate sheet 12 to be folded in a convenient manner along the fold lines to produce the rectangular prism-shaped packet 10 shown in FIG. 12. The fold lines divide the laminate sheet into a plurality of regions, including two opposing major sidewalls 26 and 29, two opposing minor sidewalls 30 and 32, and two opposing end walls 31 and 31', in which two connective-flap regions 34 and 36 connects the two major sidewall portions 24 and 28 at either side of the major sidewall 26 into one opposing major sidewall 29. It is contemplated that the configuration of the fold lines can be varied from the configuration shown in FIG. 1 and that the fold lines can be entirely omitted, as long as the laminate sheet 12 can be folded into a rectangular prism shape. The ohmic heating packet 10 can be referred to as "the rectangular prism-shaped packet 10," or preferably "the packet 10."

Two small holes 38 and 40 are formed through the minor sidewalls 30 and 32 of the laminate sheet 12. Two patches 42 and 44 made of the multilayer laminate material described above are heat-sealed over the holes 38 and 40 on the interior 16' (as shown in FIG. 2) of the minor sidewalls 30 and 32 in a reverse patch configuration, with the external polymer layers of the patches 42 and 44 sealed to the internal polymer layer 18 of the laminate sheet 12. An alternative embodiment of the invention is contemplated in which the orientations of the patches 42 and 44 are reversed, with the polymer layers 18 of the patches 42 and 44 sealed to the polymer layer 18 of the laminate sheet 12. Individually, the two patches 42 and 44 can also be referred to as a first patch 42 and a second patch 44. It is contemplated that the patches 42 and 44 can be made of any insulating material, which can be the multilayer laminate material described above.

Each of the holes 38 and 40 has a preferred diameter of about 0.8 mm, and each of the patches 42 and 44 preferably measures about 14 mm by about 18 mm. It is contemplated that the sizes of the holes 38 and 40 and the patches 42 and 44 can be varied, as long as the patches 42 and 44 are large enough to completely cover and seal over the holes 38 and 40. It is further contemplated that one or both of the patches 42 and 44 can be formed of a material that is different from the multilayer laminate material described above, as long as any such alternative material can be hermetically sealed to the interior side 16 of the laminate sheet 12.

Referring to FIGS. 1 and 2, two electrodes 46 and 48 having elongated major plate portions 50 and 52 and small rectangular flap portions 54 and 56 are fastened to the interior 16 of the laminate sheet 12 by electrically conductive stuffings 58 and 60 (small nut-and-bolt assemblies that are described in greater detail below). Electrically conductive stuffings 58 and 60 are preferably made of metal materials that are electrically conductive; hereafter, they can be referred to collectively as "electrically conductive stuffings," or preferably the "stuffings," or individually as "a first stuffing 58" (or "a first electrically conductive stuffing 58) and "a second stuffing 60" (or "a second electrically conductive stuffing 60." Similarly, the electrodes 46 and 48 are preferably made of metal materials (metallic) that are electrically conductive, such as stainless steel foil. Individually, the electrodes 46 and 48 can be referred to as "a first electrode 46" and "a second electrode 48," respectively, or the "electrode." Collectively, the electrodes 46 and 48 can be referred to as "internal electrodes," or preferably "electrodes." The stuffings 58 and 60 pass through the flap portions 54 and 56 of the electrodes 46 and 48 as well as through the patches 42 and 44 and minor sidewalls 30 and 32. The major plate portions 50 and 52 of each of the electrodes 46 and 48 are of a size and shape that is substantially similar to the size and shape of the minor sidewalls 30 and 32 of the laminate sheet 12.

Figure 3:
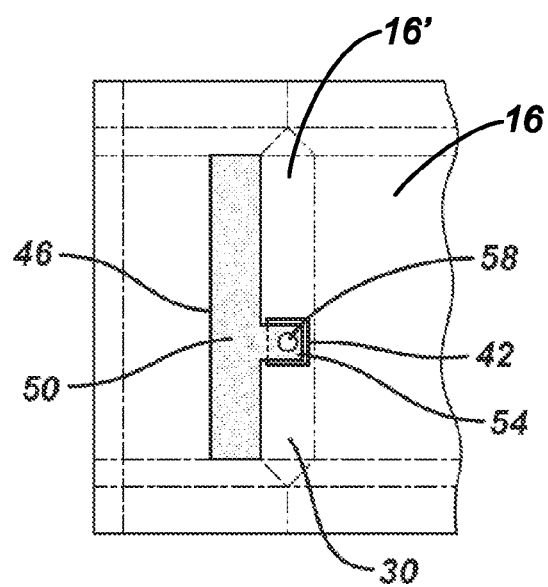
FIG. 3 is a top view illustrating an interior portion of the preferred embodiment of the present invention shown in FIG. 1 with an electrode shown in an unfolded position.
Figure 4:
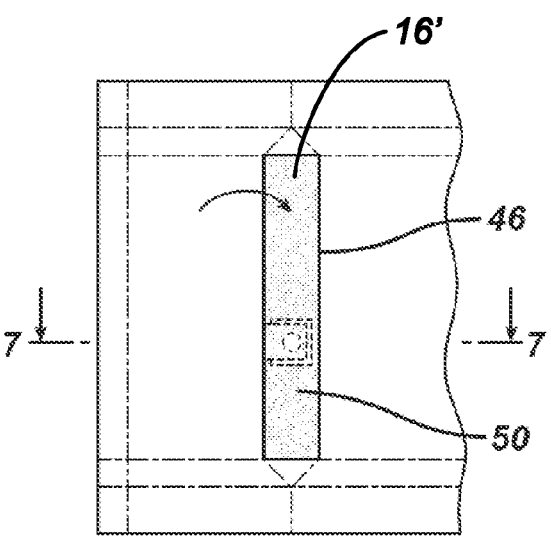
FIG. 4 is a top view illustrating an interior portion of the preferred embodiment of the present invention shown in FIG. 4 with the electrode shown in a folded position.
Figure 5:
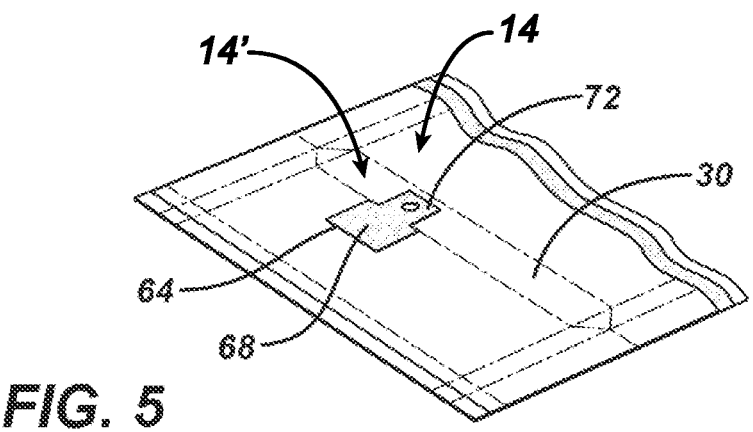
FIG. 5 is a perspective view illustrating an exterior portion of the preferred embodiment of the present invention shown in FIG. 1 with a tag shown in an unfolded position.
Figure 6:
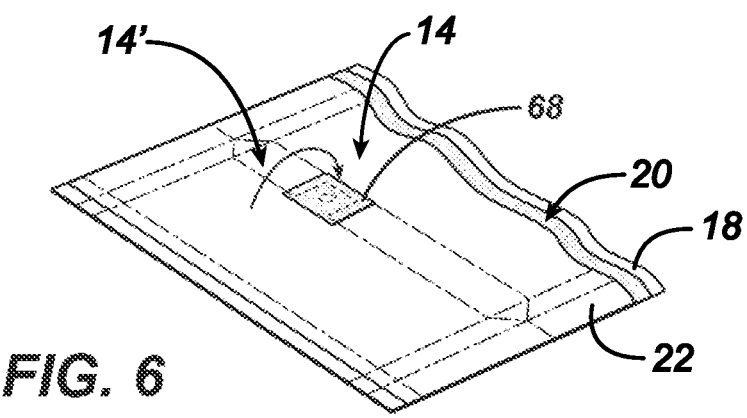
FIG. 6 is a perspective view illustrating an exterior portion of the preferred embodiment of the present invention shown in FIG. 5 with the tag shown in a folded position.

Referring to FIGS. 3 and 4, the major plate portion 50 of the electrode 46 is folded over the minor sidewall 30 and is pasted to the minor sidewall 30 with food grade adhesive. The major plate 50 portion thereby covers the patch 42, the flap portion 54 of the electrode 46, and the protruding end of the stuffing 58 to provide the interior of the assembled packet (shown in FIG. 12) with a substantially smooth, flat electrode surface that is free of irregularities. The electrode 48 is folded and secured in a substantially identical manner. In other words, the first electrode 46 and the second electrode 48 abut the first patch 42 and the second patch 44 respectively, extending along respective, opposing minor sidewalls through the major plate portions 50 and 52 of the electrodes 46 and 48. It is contemplated that the size and shape of the electrodes 46 and 48 can be varied without departing from the present invention. For example, the major plate portions 50 and 52 of the electrodes 46 and 48 can be shaped differently than the minor sidewalls 30 and 32 of the laminate sheet 12. Alternatively, the flap portions 54 and 56 of the electrodes 46 and 48 can be omitted and the major plate portions 50 and 52 can be fastened directly to the minor sidewalls 30 and 32.

Referring to FIGS. 1 and 5, two electrically conductive tags 64 and 66 having square major plate portions 68 and 70 and small, rectangular flap portions 72 and 74 are fastened to the exterior side 14' of each of the minor sidewalls 30 and 32 (the exterior side 14 of the laminate sheet 12) by the stuffings 58 and 60 described above (as shown by FIGS. 5-6), which extend through the flap portions 72 and 74 of the tags 64 and 66. The electrically conductive tags 64 and 66 are preferably made of metal materials that are electrically conductive, such as stainless steel foil. Hereafter, the electrically conductive tags 64 and 66 are referred to collectively as "conductive tag," or "external tag," or preferably "tag"; or referred to individually as "a first electrically conductive tag 64" (or "a first tag 64") and "a second electrically conductive tag 66" (or "a second tag 66"). The flap portions 72 and 74 cover the holes 36 and 38 in the minor sidewalls 30 and 32 of the laminate sheet 12. The major plate portions 68 and 70 of the tags 64 and 66 are folded over, and are pasted to, the flap portions 72 and 74 of the tags 64 and 66 in a manner similar to the electrodes 46 and 48 described above for covering the protruding external ends of the stuffings 58 and 60. The exterior of the assembled packet 10 (shown in FIG. 12) is thereby provided with conductive surfaces that are smooth, flat, and free of irregularities. It is contemplated that the size and shape of the tags 64 and 66 can be varied without departing from the present invention. For example, the major plate portions 68 and 70 of the electrodes can be circular, triangular, or irregularly-shaped. Alternatively, the flap portions 72 and 74 of the tags 64 and 66 can be omitted and the major plate portions 68 and 70 can be fastened directly to the minor sidewalls 30 and 32 of the laminate sheet 12.

Referring to the detailed cross-sectional view in FIG. 7, the stuffings 58 and 60 provide hermetic electrical connections between the electrodes 46 and 48 on the interior side 14 of the laminate sheet 12 and the tags 64 and 66 on the exterior side 16 of the laminate sheet 12 without affecting the integrity of the seal between the interior and the exterior of the assembled packet 10 or the stability of the packet 10 at high temperatures (the stuffing 60 is not shown, but is installed in a substantially identical configuration on the opposite side of the packet 10). The stuffings 58 and 60 pass through the patches 42 and 44 and not through the laminate sheet 12 itself, and are substantially smaller in diameter than the holes 38 and 40, as well as being centered in the respective holes. That is, the first and the second stuffing 58 and 60 extends through, and securely affixing, the first and the second patch 42 and 44, electrode 46 and 48 and tag 64 and 66, respectively, to each of the minor sidewalls, in which the first and second stuffing 58 and 60 are not in touch with the metallic foil layer 20 of the laminate material that forms the packet. In other words, the patches 42 and 44 are not electrically connected to the intermediate metallic layer 20 of the laminate sheet 12, nor do the stuffings 58 and 60 contact the edges of the laminate sheet 12 at the holes 38 and 40, and therefore the stuffing/patch assemblies form conduction zones that are electrically insulated from the rest of the packet 10. Thus, when an external electrical current is applied to the tags 64 and 66 (as described in greater detail below), the configuration of the stuffing/patch assemblies prevent electrical leakage into the foil layer 20 and thereby mitigates the potential for a short circuit condition.

Figure 8:
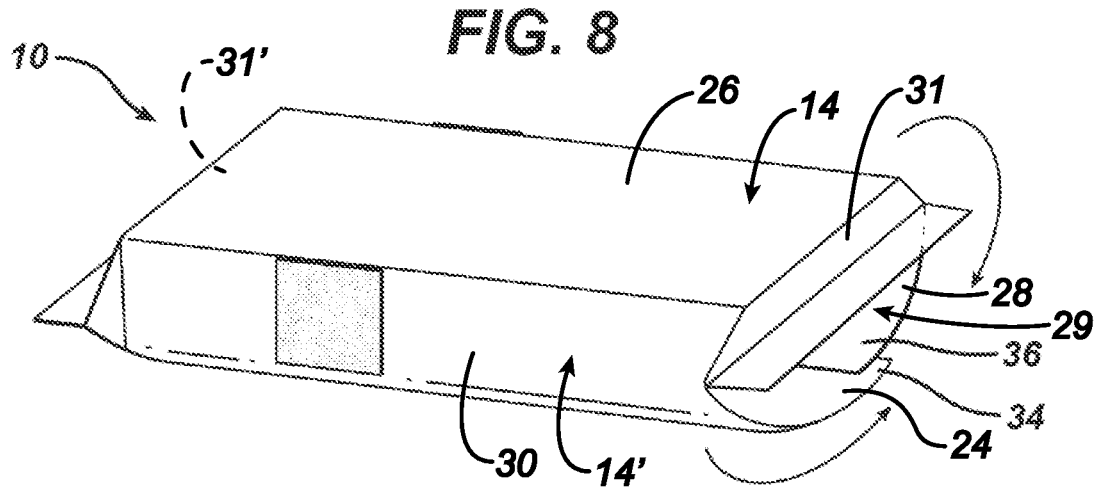
FIG. 8 is a perspective view illustrating a first step in a method for constructing the preferred embodiment of the present invention shown in FIG. 1.
Figure 9:
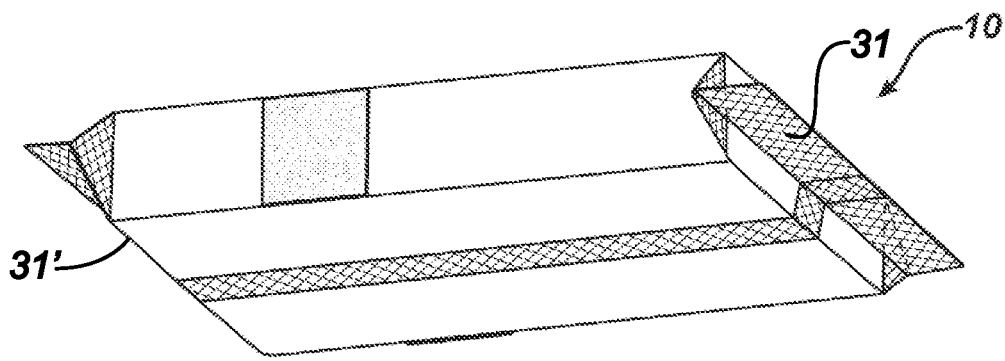
FIG. 9 is a perspective view illustrating a second step in a method for constructing the preferred embodiment of the present invention shown in FIG. 1.
Figure 10:
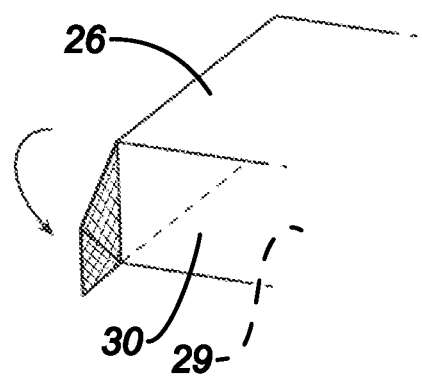
FIG. 10 is a perspective view illustrating a third step in a method for constructing the preferred embodiment of the present invention shown in FIG. 1.
Figure 11:
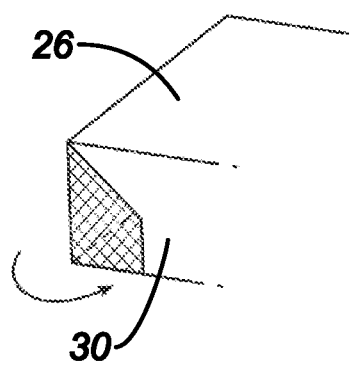
FIG. 11 is a perspective view illustrating a fourth step in a method for constructing the preferred embodiment of the present invention shown in FIG. 1.

Referring to FIG. 8, the inventive packet 10 is assembled by first folding the laminate sheet 12 along the longitudinal fold lines and bringing the connective regions 34 and 36 of the laminate sheet 12 together in an overlapping relationship. The laminate sheet is then folded, heat-sealed and pasted in the manner shown in FIGS. 8-11 to form the completed packet 10. After a first longitudinal end of the packet 10 is sealed but before the opposite longitudinal end is sealed the packet is filled with a desired food or beverage item. Assembled thusly, the interior chamber of the completed packet 10 is hermetically-sealed and has a rectangular prism-geometry, as shown in FIG. 12. In addition to the configuration described above, it is contemplated that the laminate sheet 12 can be folded, sealed, and pasted in a variety of alternative ways to achieve a hermetically-sealed, rectangular prism-shaped packet in accordance with the present invention.

Referring to FIG. 12, a slide-in heating device 70 for heating the contents of the ohmic heating packet 10 is shown. The heating device 70 includes an electrically-insulated, box-shaped enclosure 72 having an opening 77 at one longitudinal end 71 that is large enough to accept the packet 10. Conductive plates 74 and 76 are mounted to the interior of the enclosure 72 adjacent the enclosure's laterally opposing sidewalls and are angled to create a tapered slot 75 that narrows from the open end 73 of the enclosure to the opposing closed end 73' of the enclosure 72. The plates 74 and 76 are preferably formed of flexible metal, or are hinged at their points of connection to the interior of the enclosure 72, for allowing the plates 74 and 76 to pivot toward the sidewalls of the enclosure 72. Electrical conductors 78 and 80 connect the conductive plates 74 and 76, respectively, to an external electrical power source (not shown).

In order to heat the contents of the packet 10, the packet 10 is longitudinally slid into the tapered slot of the heating device 70, as indicated in FIG. 12 by the arrow. As the packet 10 progresses into the enclosure 72, the tags 64 and 66 on the exterior of the packet 10 are moved into engagement with the conductive plates 74 and 76, causing the plates 74 and 76 to move toward the sidewalls of the enclosure 72. With the packet inserted thusly, a voltage is applied to the conductive plates 74 and 76. The amount of voltage applied will vary depending on the composition of the food or beverage item that is to be heated. Electrical current is thereby conducted from the conductive plates 74 and 76 to the tags 64 and 66, through the stuffings 58 and 60, and to the electrodes 46 and 48 within the packet 10. The current then passes between the energized electrodes 46 and 48 and through the food item contained in the packet 10, thereby rapidly heating the food item in a manner that will be understood by those skilled in the art. The rectangular prism geometry of the packet 10 and the flat, parallel configuration of the electrodes 46 and 48 facilitate highly uniform heating of the food item.

In addition to the slide-in heating device 70 described above, it is contemplated that a variety of other means can be employed for applying electrical current to the tags 64 and 66 of the packet 10 to facilitate ohmic heating of the packet's contents. Most simply, a pair of energized conductors, such as the conductors 78 and 80, can be applied directly to the tags 64 and 66. In particular, when sterilization is desired and temperatures need to be higher than the boiling point of water at atmospheric pressure, the package could be located within a chamber that is pressurized with air or other gas prior to connection of conductors 78 and 80, so that the pressure of internal expanding contents may be balanced by the external pressure, thus preventing undue stresses that could rupture the packet's seals.

To access the contents of the packet 10, one of the longitudinal ends of the packet is preferably unfolded (i.e. by manually overcoming the adhesive that holds the folded portions of the longitudinal end together) and a lateral cut is made across the sealed, longitudinal end of the packet with a pair of scissors or a knife. Alternatively, if the adhesive is too strong to overcome by manual force, the packet 10 can simply be cut. The contents of the packet 10 can then be removed and consumed. It is contemplated that the packet 10 can then be refilled and resealed (e.g. using a heat-sealing process) to enable reuse of the packet. Since the electrodes 46 and 48 and tags 64 and 66 of the packet 10 are still intact, the packet 10 can be reused to sterilize food that may be grown on a planetary base, or to sterilize waste that might otherwise accumulate in the spacecraft environment and pose a microbiological hazard to the crew.

Figure 13:
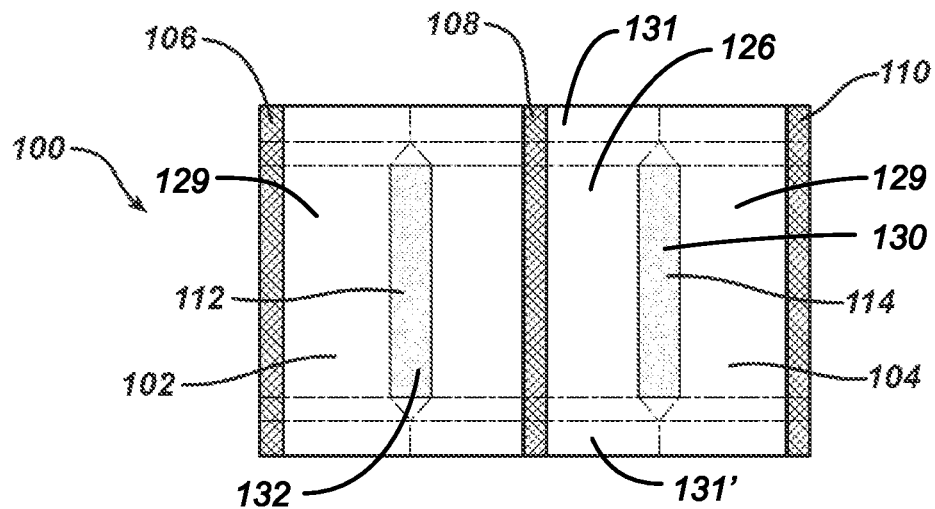
FIG. 13 is a top view illustrating an interior of an alternative embodiment of the present invention in an unfolded and unbounded configuration.
Figure 14:
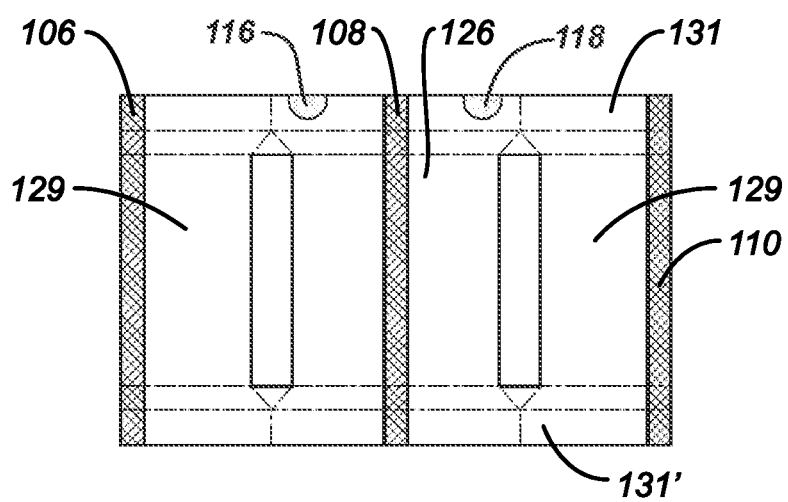
FIG. 14 is a top view illustrating an exterior of the alternative embodiment of the present invention shown in FIG. 13
Figure 15:
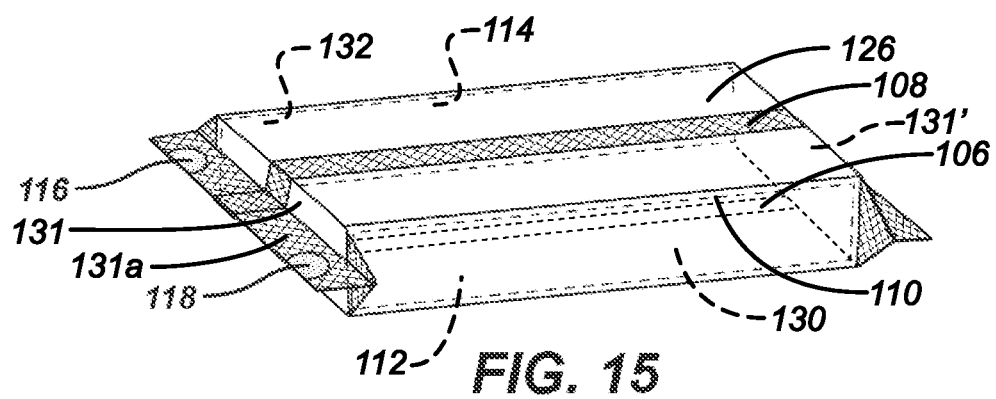
FIG. 15 is a perspective view illustrating the alternative embodiment of the present invention shown in FIG. 13 in a partially folded and bounded configuration.

Referring now to FIGS. 13-15, an alternative ohmic heating packet 100 is shown wherein the above-described internal electrodes 46 and 48, the insulating patches 42 and 44, and the external tags 64 and 66 shown in the packet 10 are omitted. Instead, the multilayered material that forms the packet 10 (shown in FIGS. 2 and 7) is used to create two separate conductive regions that are insulated from one another. This is accomplished by forming the packet 100 from two separate sheets 102 and 104 of laminate material that are heat-sealed to one another in an overlapping relationship along a connective seam regions 106, 108 and 110. The laminate sheets 102 and 104 are made of the multilayered material of the packet 10, including a layer of metallic foil 20 sandwiched between an exterior polymer layer 22 and an interior polymer layer 18. The laminate sheets 102 and 104 can also be referred to as a first 102 of the sheets and a second 104 of the sheets. Similar to the overlapping relationship between the connective regions 34 and 36 for packet 10 (see FIG. 8), the connective seam regions 106 and 108 are brought together into an overlapping relationship to form one connective region (not shown in FIG. 15), which is similar to the connective seam region 110. The metallic foil layers 20 of the laminate sheets 102 and 104 are therefore not in contact with each other. The connective seam regions 106, 108 and 110 are electrically insulating. As such, the metallic foil layer 20 of the first 102 of the sheets is electrically insulated from the metallic foil layer 20 of the second 103 of the sheets, mitigating the risk of a short circuit condition when a current is applied to the metallic foil layers. Referring to FIGS. 2 and 13, elongated interior slots 112 and 114 are cut from the interior polymer layers 18 of the laminate sheets 102 and 104 along the minor sidewalls 130, 132 respectively, leaving portions of the metallic foil layers 20 of the sheets along the minor sidewalls exposed to the interior of the assembled packet 100 (shown in FIG. 15). As illustrated in FIGS. 13-15, the packet 100 is preferably in the shape of a rectangular prism (can also be referred to as the rectangular prism-shaped packet 100), including two opposing major sidewalls 126 and 129, two opposing minor sidewalls 130 and 132, and two opposing end walls 131 and 131'. The two opposing end walls 131, 131' preferably have an end-flap region 131a (shown in FIG. 15). The elongated interior slots 112 and 114 are electrically conductive regions that are located on the interior side of the minor sidewalls 130, 132. Similarly, referring to FIG. 14, small circular exterior slots 116 and 118 (hereafter referred to as "exterior slots") are cut from the end-flap regions of the exterior polymer layers 22 of the laminate sheets 102 and 104, leaving the metallic foil layers 20 of the sheets 102 and 104 exposed to the exterior of the assembled packet 100. The exterior slots 116 and 118 are electrically conductive regions that are located on the exterior side of the assembled packet 100. It is contemplated that the exterior slots 116 and 118 can be cut from elsewhere in the exterior polymer layers 22 and that the slots 116 and 118 can have shapes other than circular.

In order to heat food or beverage items contained within the inventive packet 100, electrical current is applied to the exposed metallic foil_regions within the exterior slots 116 and 118 on the exterior of the packet 100, such as with a pair of conductors that are connected to an external electrical power source using clamps, clips, or other connecters (not shown). The applied current is conducted through the intermediate metallic foil layers 20 of the elongated interior slots 112 and 114 that are exposed to the interior of the packet 100. The current is thereby allowed to pass between the exposed, elongated interior slots 112 and 114 and through the food or beverage item contained within the packet 100. The exposed regions of metallic foil layer 20 within the elongated interior slots 112 and 114 on the interior of the packet 100 thereby perform the same function as the electrodes 46 and 48 of the packet 10 described above. The electrically-insulating seam regions 106, 108 and 110 that separate the metallic foil layers 20 of the two laminate sheets 102 and 104 mitigate the risk of a short circuit condition when current is applied to the metallic foil layers.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A sterile, ohmic heating container for sterilizing, heating, or storing food and beverage items, the container comprising:
    a) a rectangular prism-shaped packet formed of a multilayer laminate material that includes a metallic foil layer sandwiched between an exterior polymer layer and an interior polymer layer, wherein the exterior and interior polymer layers are composed of polypropylene or polyethylene, the packet has two opposing major sidewalls, two opposing minor sidewalls, and two opposing end walls, wherein each minor sidewall has a hole formed through it, wherein sides of the minor sidewalls are sealed against adjacent sides of the major sidewalls and adjacent sides of one end wall to form the rectangular prism-shaped packet that is open at an opposing end wall to receive a food or beverage food item, and said opposing end wall is sealed against the minor and major sidewalls thereafter to form a hermetically sealed body of the packet, wherein the metallic foil layer and the multilayer laminate material extend throughout the hermetically sealed body of the packet;
    b) a first and a second patch of insulating material hermetically sealed to an interior of each of the minor sidewalls and covering the holes on the interiors of the minor sidewalls, wherein the insulating patches are not electrically connected to the metallic foil layer;
    c) a first and a second electrode abutting the first and the second patches, respectively, on the interior of the packet and extending along respective, opposing minor sidewalls;
    d) a first and a second electrically conductive tag abutting an exterior of each of the minor sidewalls, covering the holes on the exteriors of the minor sidewalls; and
    e) a first and a second electrically conductive stuffings extending through the first and the second patch, and securely affixing to the first and second electrodes and to the first and second electrically conductive tags, respectively, to each of the minor sidewalls so that the first and second electrically conductive stuffings provide hermetic electric connection between the first and second electrodes on the interior sides of the laminate sheet and the first and second tags on the exterior sides of the laminate sheet, respectively, without affecting the integrity of the seal between the interior sides and the exterior sides of the packet or the stability of the packet at high temperature;
    wherein the first and the second patches insulate the first and the second stuffings from being in contact with the metallic foil layer of the laminate material that forms the packet; and
    wherein when an electrical current is applied to the electrically conductive tags on the exterior of the packet, the electrical current is conducted from the electrically conductive tags, through the first and the second stuffings on the minor sidewalls of the packet, to the first and second electrodes on the interior of the packet, while the electric current is insulated by the first and second patches from getting in contact with the metallic foil layer of the body of the packet to prevent any leakage of the electrical current into the metallic foil layer of the packet.

2. The ohmic heating container in accordance with claim 1, wherein each of the electrodes has a size and a shape that is substantially similar to a size and a shape of the respective minor sidewall it abuts, and wherein the electrodes are oriented substantially parallel to one another.

3. The ohmic heating container in accordance with claim 1, further comprising a slide-in heating device for heating the contents of the packet, the heating device having an electrically-insulated enclosure with an opening at an open end that is large enough to accept the packet, elongated conductive plates that are mounted within the enclosure in a spaced relationship for engaging the conductive tags of the packet, wherein the conductive plates are angled to create a tapered slot within the enclosure that narrows from the open end of the enclosure to an opposing closed end of the enclosure, and electrical conductors extending from each of the conductive plates for connection to an external electrical power source.

4. A sterile, ohmic heating container for sterilizing, heating, or storing food and beverage items, the container comprising a rectangular prism-shaped packet formed of at least two sheets of a multilayer laminate material that are bonded together in an overlapping relationship to form connective seam regions, the laminate material including a layer of metallic foil sandwiched between an exterior polymer layer and an interior polymer layer, wherein the exterior and interior polymer layers are composed of polypropylene or polyethylene;
    wherein the package has two opposing major sidewalls, two opposing minor sidewalls, and two opposing end walls, in which sides of the minor side walls are sealed against adjacent sides of the major sidewalls and adjacent sides of one end wall to form the rectangular prism-shaped package that is open at an opposing end wall to receive a food or beverage food item, and thereafter, each of the two opposing end walls is sealed against the minor and major sidewalls respectively to form a hermetically sealed body of the packet, wherein the metallic foil layer of the multilayer laminate material extends throughout the hermetically sealed body of the packet;
    wherein the interior polymer layer of each of the sheets has an elongated interior slot formed in it for exposing the metallic foil layer to an interior of the packet and wherein the exterior polymer layer of each of the sheets has an exterior slot formed in it for exposing the metallic foil layer to an exterior of the packet;

wherein the metallic foil layer of a first of the sheets is electrically insulated from the metallic foil layer of a second of the sheets by the connective seam regions, creating separate conductive regions that are insulated from one another while maintaining the hermetically sealed body of the packet; and wherein when an electrical current is applied to the exterior slots, the electrical current is conducted through the metallic foil layer of the first and second of sheets to pass into the interior slots, and the connective seam regions insulate on the metallic foil layer of the first of the sheets from the metallic foil layer of the second of the sheets to mitigate a risk of a short circuit condition.

5. The ohmic heating container in accordance with claim 4, wherein the slots in the interior polymer layer are formed in the minor sidewalls of the packet.

6. The ohmic heating container in accordance with claim 4, wherein the slots in the exterior polymer layer are formed in the end walls of the packet.

7. The ohmic heating container in accordance with claim 1, wherein the first and the second patches are composed of the multilayer laminated material.

* * * * *